United States Patent Office 3,259,231
Patented July 5, 1966

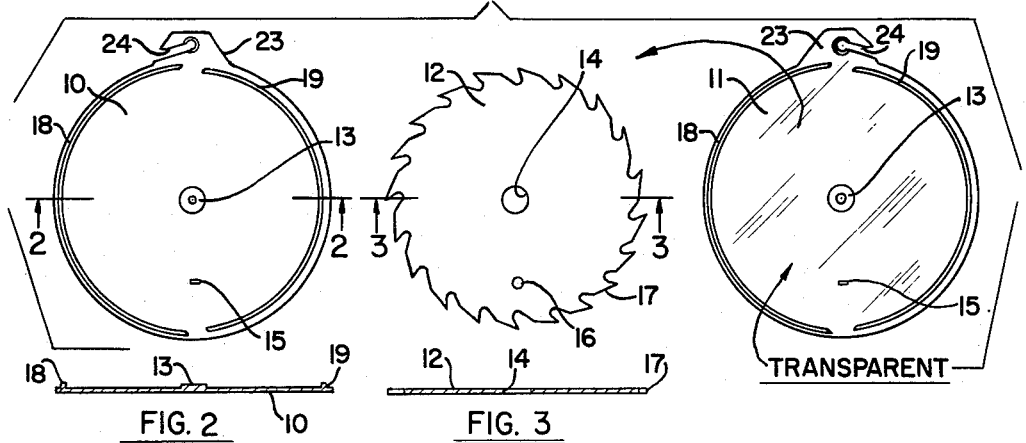
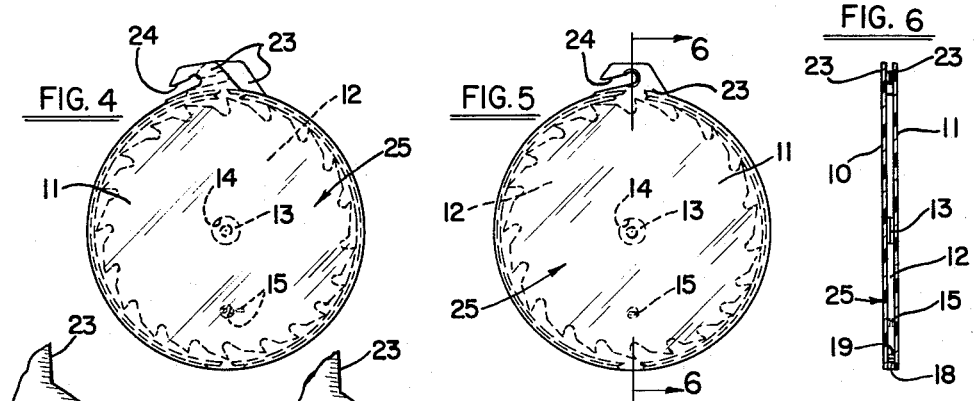
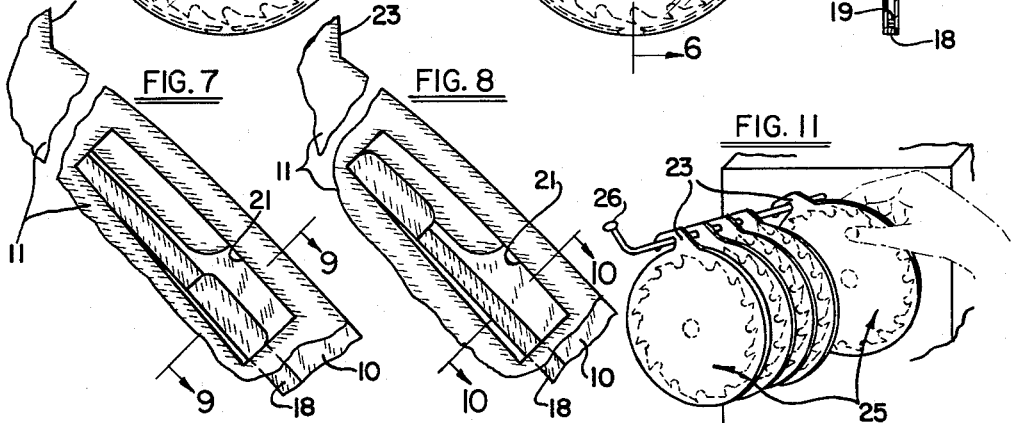
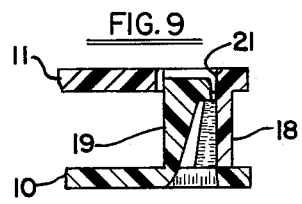
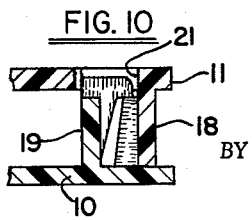

3,259,231
PACKAGE FOR ARTICLE OF MANUFACTURE
Henry J. Romanowski, Towson, Ernest C. Ashauer, Baltimore, and Charles B. Pittinger, Reisterstown, Md., assignors to The Black and Decker Manufacturing Company, Towson, Md., a corporation of Maryland
Filed Aug. 17, 1964, Ser. No. 390,097
5 Claims. (Cl. 206—16)

The present invention relates to a package for an article of manufacture, and more particularly, for a substantially-flat circularly-shaped article of manufacture, as for example, a saw blade.

It is an object of the present invention to provide a simple, economical plastic package for a saw blade or similar article of manufacture, which will be attractive from a merchandising standpoint, and which may be re-used repeatedly by the purchaser.

In accordance with the broad teachings of the present invention, there is herein illustrated and described, a package for a substantially-flat circularly-shaped article of manufacture; and preferably, the package comprises a pair of molded plastic members which are substantially identical to one another, with each member comprising a substantially-flat disc. One of the members is laterally reversed, axially and circumferentially alined with the other member, and received over the other member to house the article mutually therebetween; and suitable means are provided to removably secure the members together, preferably by a relative circumferential twisting movement therebetween.

In accordance with the further teachings of the present invention, there is herein illustrated and described, a package for a substantially-flat circularly-shaped article of manufacture, as for example, a saw blade, wherein the package comprises a pair of members which are substantially identical to one another, with each member comprising a substantially-flat circular disc. Means are provided to removably interlock the members together, such that the article is housed mutually therebetween. At least one of the members is substantially transparent, such that the article is readily visible to the purchaser and ultimate user, and means are provided to support the article between the members and to prevent circumferential movement of the article relative to the members.

In accordance with the further teachings of the present invention, the means to removably interlock the members together comprises a first arcuate peripheral rib formed along one side of each member and a second arcuate peripheral rib formed on each member diametrically opposite to the first rib. One of the ribs is spaced radially inwardly of the other rib, whereby one of the members may be laterally reversed, axially and circumferentially alined with the other member, and fitted over the other member; in this manner, the second rib of the one member telescopes within the first rib of the other member, and conversely, the second rib of the other member telescopes within the first rib of the one member. The cooperating ribs may then be held together by means of a tongue on one rib and a cooperating arcuate slot formed alongside the complementary rib.

In accordance with a preferred specific embodiment of the present invention, means are provided to suspend the package from a suitable support; this means comprises a hook formed integrally with the member and having a slot formed therein, the slot being progressively angled in an outward radial direction towards the bottom of the slot. In this manner, a desired individual package may be selected from a stack of packages mounted on a hanger (or its equivalent) without necessitating a removal of the entire stack or front portion thereof.

These and other objects of the present invention will become apparent from a reading of the following specification, taken in conjunction with the enclosed drawings, in which:

FIGURE 1 is an exploded plan view of a preferred embodiment of the present invention, namely, of a saw blade package, and illustrates the pair of substantially-identical molded plastic members that house the saw blade mutually therebetween;

FIGURE 2 is a section view, taken along the line 2—2 of the bottom plastic member shown in FIGURE 1;

FIGURE 3 is a section view, taken along the lines 3—3 of the saw blade of FIGURE 1;

FIGURE 4 shows the parts of FIGURE 1 in assembled relationship to each other, but before the members are interlocked by a relative circumferential twisting movement;

FIGURE 5 corresponds substantially to that of FIGURE 4, but shows the package in its assembled form;

FIGURE 6 is a section view, taken along the lines 6—6 of FIGURE 5, showing the manner in which the blade is enclosed and supported within the package;

FIGURE 7 is an enlarged fragmentary portion of FIGURE 4, showing the cooperating annular ribs and the manner in which a tongue formed on one of the ribs is received within an arcuate slotted opening formed alongside the other cooperating rib;

FIGURE 8 is an enlarged fragmentary portion of FIGURE 5, corresponding substantially to that of FIGURE 7, but showing the ribs in interlocked position;

FIGURE 9 is a detail section view, taken along the lines 9—9 of FIGURE 7;

FIGURE 10 is a detail section view, taken along the lines 10—10 of FIGURE 8; and FIGURE 11 is a perspective view of a stack of saw blade packages mounted on a suitable hanger, illustrating the manner in which one of the packages may be conveniently removed intermediately of the entire stack of packages without necessitating a removal of the remainder of the stack in front of the desired package.

With reference to FIGURES 1 to 5, there is illustrated a pair of members 10 and 11 which comprise the package of the present invention. The members 10 and 11 are substantially identical to one another and may be economically molded from a suitable plastic material; and preferably, at least one of the members, such as the member 11 illustrated in FIGURE 1, is made of a transparent material. In this specific embodiment of the invention, the members 10 and 11 are adapted to enclose a saw blade 12; however, it will be understood that the teachings of the present invention are equally applicable to other articles of manufacture.

With this in mind, the members are formed with respective central hubs 13 which cooperate with each other and with the usual central aperture 14 in the saw blade, see FIGURE 6, to thereby support the saw blade between the members. Moreover, a tab 15 is formed on each member radially of the hub, and when the members are brought together, the tabs cooperate with each other and with a hole 16 formed in the saw blade radially of its central aperture 14, to prevent a relative circumferential movement of the saw blade within the completed package. In this regard, it is noted that the teeth 17 formed on the saw blade might otherwise cut into the plastic material during transportation and storage of the package. The saw blade 12 is fitted within the member 10 in the manner as previously described; and the member 11 is laterally reversed, axially and circumferentially alined with the member 10, and received over the member 10 as is shown in FIGURE 4.

As shown more clearly in FIGURE 1, a first arcuate peripheral rib 18 is formed alongside of each member— the members are substantially identical to one another and are made basically on the same mold—and a second arcuate peripheral rib 19 is formed on each member diametrically opposite to the first rib 18. One of the ribs, such as the rib 19, is spaced radially inwardly of the first rib 18. Consequently, when the member 11 is laterally reversed and is axially and circumerentially alined with the member 10 and is fitted over the member 10, it will be appreciated that the rib 19 of member 11 will telescope radially within the rib 18 of member 10, and likewise, the rib 19 of member 10 will telescope radially within the rib 18 of member 11 as is shown more particularly in FIGURE 7. In such a manner, the members 10 and 11 are joined together and are then interlocked by a relative circumferential twisting movement as shown in FIGURES 4 and 5.

In the position of FIGURE 5, suitable latching means are provided to hold the cooperating ribs of the members 10 and 11 together. Preferably, this latching means comprises a raised tongue 20 formed on one of the cooperating ribs, such as the rib 19 of each member. An arcuate slotted opening 21 is formed along side of the other cooperating rib 18 of the other member. This arcuate slotted opening is spaced radially inwardly from its rib and is adapted, as is shown in FIGURES 7 and 8, to receive its respective tongue 20 when the members 10 and 11 are fitted together in the position shown in FIGURE 4. Each arcuate slotted opening 21 has a bottom wall 22 which is progressively narrowed (radially outwardly) in a circumferential direction towards the bottom of the opening; and consequently, when the members are brought together by the relative circumferential twisting movement to the position of FIGURE 5, each tongue 20 will be cammed within its respective opening 21 and will preferably acquire a slight interference fit therein.

Means are further provided to suspend the package from a suitable support. This means preferably comprises a hook 23 formed integrally with each member. The hook 23 is the only portion which is different between the members 10 and 11, it being noted again that the members are laterally reversed with respect to each other. This, however, is of no great concern in manufacture inasmuch as the hook portion 23 of the required mold may take the place of an economical insert which can be removably secured within the overall mold for the members 10 and 11. The hook 23 has a slot 24 formed therein, and the slot 24 is progressively angled in an outward radial direction towards its bottom. This facilitates a firm holding of the completed package, such as the package 25 shown in FIGURE 5.

The hook 23 and its formation with respect to the overall package 25 allows an individual package, as is shown in FIGURE 11, to be removed intermediately of an overall stack of packages mounted on a hanger 26 or its equivalent, and therefore, it is not necessary to remove all the packages in front of a desired package in order to get to it.

The package of the present invention, which may be used with various articles of manufacture (besides a saw blade) is economically and conveniently formed from a suitable plastic material at a cost which compares favorably with the usual paper or cardboard packages or the usual plastic "bubble" packs heretofore resorted to in the prior art. Moreover, the transparent quality of the top member 11 allows the article to be viewed directly by the purchaser, and any type of advertising material (or use and care instructions) may be printed directly on the article itself, as is usually done in any event with a saw blade; and hence additional printing costs are avoided. Also, the prior art packages, once opened, are invariably not reusable, while the plastic package of the present invention may be used repeatedly by the purchaser for convenient storage of the saw blade (or other article) in his home or workshop.

Obviously, many modifications may be made without departing from the basic spirit of the present invention; and accordingly, within the scope of the appended claims, the invention may be practiced other than has been specifically described herein.

We claim:
1. A package for a substantially-flat circularly-shaped article of manufacture, as for example, a saw blade having promotional and instructional printing thereon, said package comprising:
   (a) a pair of molded plastic members, substantially identical to one another, and each comprising a substantially-flat circular disc;
   (b) means to removably secure said members together, whereby the article is housed mutually therebetween and may be readily removed from the package, and whereby the package is continuously reusable;
   (c) at least one of said members being substantially transparent, whereby the article with its printing is readily visible;
   (d) means supporting the article between said members; said means comprising a central boss formed on at least one member and received within a cooperating central aperture formed in the article; and
   (e) means preventing substantial circumferential movement of the article about said central boss as a pivot point; said means comprising an element formed on at least one member and a cooperating aperture formed in the article radially of its central aperture, whereby the article with its printing is at all times oriented with respect to the package.

2. The package of claim 1, wherein said means to removably secure said members together, comprises:
   (a) a first arcuate peripheral rib formed along one side of each member;
   (b) a second arcuate peripheral rib formed on each member diametrically opposite to said first rib;
   (c) one of said ribs being spaced radially inwardly of the other rib, whereby one of said members may be laterally reversed, axially and circumferentially alined with the other member, and fitted over the other member, with the second rib of said one member telescoping within the first rib of said other member, and the second rib of said other member telescoping within the first rib of said one member; and
   (d) latching means between said cooperating ribs to hold said members together.

3. The package of claim 2, wherein said latching means comprises:
   (a) a raised tongue formed on one of said cooperating ribs intermediate its length; and
   (b) an arcuate slotted opening formed along the other cooperating rib, radially inwardly thereof, to receive said tongue;
   (c) said opening having a bottom wall which is progressively narrowed radially outwardly, in a circumferential direction towards the bottom of said opening, whereby said tongue is cammed within said opening and acquires a slight interference fit therein.

4. The package of claim 1, wherein means are provided on at least one of said members to suspend the package from a suitable support, said means comprising:
   (a) a hook formed integrally with said one member;
   (b) said hook having a slot formed therein; and
   (c) said slot being progressively angled in an outward radial direction towards the bottom of said slot, whereby the package may be attractively merchandised and easily selected by the customer.

5. A package for an article of manufacture, as for example a saw blade having promotional and instructional printing thereon, said package comprising:
   (a) a pair of members releasably joined together with the article enclosed therebetween, whereby the article may be readily removed from the package, and whereby the package is continuously reusable;
(b) one of said members constituting the cover for the other member; said one member being transparent, whereby the article with its printing is readily visible;
(c) means joined to at least one of the members for suspending the package from a suitable support, whereby the package may be attractively merchandised and easily selected by the customer;
(d) means supporting the article between the members, whereby, with the package held in a vertical position, the article will be supported against substantial vertical movement within the package; and
(e) an element formed on at least one of the members; said element being received in a cooperating aperture means formed in the article; said element and cooperating aperture means being spaced from said last-named supporting means, whereby the article is prevented from moving circumferentially about said supporting means as a pivot point, and whereby the article with its printing is at all times oriented with respect to the package.

References Cited by the Examiner

UNITED STATES PATENTS

| | | | |
|---|---|---|---|
| 2,452,230 | 10/1948 | Derham | 220—40 |
| 2,459,460 | 1/1949 | Segal | 206—47 |
| 2,950,004 | 8/1960 | Acomb | 206—78 |
| 3,032,242 | 5/1962 | Roberts. | |
| 3,169,682 | 2/1965 | Hollingsworth | 206—52 |

THERON E. CONDON, *Primary Examiner.*

W. T. DIXSON, *Assistant Examiner.*